(12) United States Patent
Guo et al.

(10) Patent No.: US 12,468,290 B2
(45) Date of Patent: Nov. 11, 2025

(54) SYSTEM AND METHOD FOR DEVELOPING A NUMERICAL CONTROL MANUFACTURING PROGRAM

(71) Applicant: Pratt & Whitney Canada Corp., Longueuil (CA)

(72) Inventors: Changsheng Guo, South Windsor, CT (US); Clement Drouin Laberge, Terrebonne (CA); Joel Jean, Shannon (CA)

(73) Assignee: Pratt & Whitney Canada Corp., Longueuil (CA)

( * ) Notice: Subject to any disclaimer, the term of this patent is extended or adjusted under 35 U.S.C. 154(b) by 480 days.

(21) Appl. No.: 17/866,118

(22) Filed: Jul. 15, 2022

(65) Prior Publication Data

US 2024/0019848 A1 Jan. 18, 2024

(51) Int. Cl.
G05B 19/418 (2006.01)
(52) U.S. Cl.
CPC ..... G05B 19/4181 (2013.01); G05B 19/4183 (2013.01); G05B 19/41845 (2013.01)
(58) Field of Classification Search
CPC ............ G05B 19/4181; G05B 19/4183; G05B 19/41845
USPC ......................................................... 700/159
See application file for complete search history.

(56) References Cited

U.S. PATENT DOCUMENTS

| 6,804,575 | B2 | 10/2004 | Sagawa |
| 6,907,313 | B2 | 6/2005 | Matthews |
| 7,117,056 | B2 | 10/2006 | Balic |
| 8,005,567 | B2 | 8/2011 | Porter |
| 10,466,681 | B1 | 11/2019 | Jones |
| 2001/0000805 | A1 | 5/2001 | Kadono |
| 2003/0171841 | A1 | 9/2003 | Porter |

(Continued)

FOREIGN PATENT DOCUMENTS

| CN | 113341882 | 6/2022 |
| EP | 3582045 A1 | 12/2019 |

OTHER PUBLICATIONS

EP Search Report for EP Patent Application No. 23185811.9 dated Apr. 26, 2024.

*Primary Examiner* — Jigneshkumar C Patel
(74) *Attorney, Agent, or Firm* — Getz Balich LLC

(57) ABSTRACT

A method for developing a numerical control manufacturing program for a common geometric feature of a first component includes obtaining manufacturing process data for the common geometric feature. The manufacturing process data is associated with one or more numerical control manufacturing processes for the common geometric feature of one or more second components. Each of the one or more second components includes the common geometric feature. The method further includes determining one or more manufacturing constraints for the numerical control manufacturing program for the common geometric feature of the first component, selecting a numerical control manufacturing process of the one or more numerical control manufacturing processes, obtaining manufacturing process parameters for the selected one or more numerical control manufacturing processes, and developing the numerical control manufacturing program for the common geometric feature of the first component. The developed numerical control manufacturing program includes the manufacturing process parameters.

16 Claims, 9 Drawing Sheets

(56) References Cited

U.S. PATENT DOCUMENTS

| | | | |
|---|---|---|---|
| 2016/0325851 A1* | 11/2016 | Turner | B23P 15/00 |
| 2016/0327937 A1* | 11/2016 | Erion | B64F 5/10 |
| 2020/0201284 A1* | 6/2020 | Edwards | G05B 19/4097 |
| 2021/0003992 A1 | 1/2021 | Nakamoto | |
| 2022/0107626 A1 | 4/2022 | Jennessen | |

* cited by examiner

SYSTEM AND METHOD FOR DEVELOPING A NUMERICAL CONTROL MANUFACTURING PROGRAM

TECHNICAL FIELD

This disclosure relates generally to component manufacturing processes and more particularly to systems and methods for developing numerical control (NC) manufacturing programs for manufacturing components.

BACKGROUND OF THE ART

The manufacture of components for complex equipment, such as gas turbine engines, may require the performance of one or more manufacturing processes including numerical control (NC) manufacturing processes. Various computer-aided manufacturing (CAM) systems are known in the art and have been used to assist with development of numerical control manufacturing processes. While these known systems have various advantages, there is still room in the art for improvement. For example, substantial revision and/or modification by experienced numerical control programmers with extensive manufacturing knowledge may be necessary to complete the development of numerical control manufacturing processes. There is a need in the art, therefore, for improved systems and methods for developing manufacturing programs which may include one or more numerical control manufacturing processes for the manufacture of components.

SUMMARY

It should be understood that any or all of the features or embodiments described herein can be used or combined in any combination with each and every other feature or embodiment described herein unless expressly noted otherwise.

According to an aspect of the present disclosure, a method for developing a numerical control manufacturing program for a common geometric feature of a first component includes obtaining manufacturing process data for the common geometric feature. The manufacturing process data is associated with one or more numerical control manufacturing processes for the common geometric feature of one or more second components. Each of the one or more second components is different than the first component. Each of the one or more second components includes the common geometric feature. The method further includes determining one or more manufacturing constraints for the numerical control manufacturing program for the common geometric feature of the first component, selecting a numerical control manufacturing process of the one or more numerical control manufacturing processes by evaluating the manufacturing process data for each numerical control manufacturing process of the one or more numerical control manufacturing processes using the one or more manufacturing constraints, obtaining manufacturing process parameters for the selected one or more numerical control manufacturing processes, and developing the numerical control manufacturing program for the common geometric feature of the first component. The developed numerical control manufacturing program includes the manufacturing process parameters.

In any of the aspects or embodiments described above and herein, the method may further include manufacturing the common geometric feature of the first component using the developed numerical control manufacturing program.

In any of the aspects or embodiments described above and herein, the method may further include collecting the manufacturing process data for the common geometric feature while manufacturing the common geometric feature using the developed numerical control manufacturing program.

In any of the aspects or embodiments described above and herein, the one or more manufacturing constraints may include one or more of a process capability (Cpk) threshold, a process performance (Ppk) threshold, a manufacturing cost threshold, a cycle time threshold, a preferred manufacturing site, or a preferred manufacturer.

In any of the aspects or embodiments described above and herein, the common geometric feature may be a surface.

In any of the aspects or embodiments described above and herein, the method may further include indexing the common geometric feature in a database by assigning the common geometric feature a unique ID.

In any of the aspects or embodiments described above and herein, the method may further include storing the manufacturing process data and the manufacturing process parameters associated with the common geometric feature of the one or more second components as a dataset in the database and assigning the unique ID to the dataset.

In any of the aspects or embodiments described above and herein, the selected numerical control manufacturing process may include one or more of a wire electrical discharge machining (WEDM) process, an abrasive machining process, a broaching process, or a milling process.

In any of the aspects or embodiments described above and herein, the manufacturing process parameters may include one or both of computer-aided manufacturing instructions or numerical control manufacturing instructions for the common geometric feature.

According to another aspect of the present disclosure, a system for developing a numerical control manufacturing program for a common geometric feature of a first component includes a processor and a non-transitory memory in signal communication with the processor. The non-transitory memory stores instructions which, when executed, cause the processor to obtain manufacturing process data for the common geometric feature. The manufacturing process data is associated with one or more numerical control manufacturing processes for the common geometric feature of one or more second components. Each of the one or more second components is different than the first component. Each of the one or more second components includes the common geometric feature. The non-transitory memory further stores instructions which, when executed, cause the processor to obtain one or more manufacturing constraints for the numerical control manufacturing program for the common geometric feature of the first component, select a numerical control manufacturing process of the one or more numerical control manufacturing processes by evaluating the manufacturing process data for each numerical control manufacturing process of the one or more numerical control manufacturing processes using the one or more manufacturing constraints, obtain manufacturing process parameters for the selected numerical control manufacturing process, and develop the numerical control manufacturing program for the common geometric feature of the first component. The developed numerical control manufacturing program includes the manufacturing process parameters.

In any of the aspects or embodiments described above and herein, the non-transitory memory may further store a plurality of 3D component models. The plurality of 3D component models may include a first 3D component model of the first component and one or more second 3D component models of the respective one or more second components.

In any of the aspects or embodiments described above and herein, the system may further include a database in signal communication with the processor. The database may store the manufacturing process data and the manufacturing process parameters. The non-transitory memory may further store instructions which, when executed, cause the processor to identify one or both of the manufacturing process data or the manufacturing process parameters for the common geometric feature using a unique ID assigned to the common geometric feature.

In any of the aspects or embodiments described above and herein, the system may further include a numerically-controlled manufacturing device configured to execute the developed numerical control manufacturing program to manufacture, at least in part, the common geometric feature of the first component.

According to another aspect of the present disclosure, a method for developing a numerical control manufacturing program for a common geometric feature of a first component includes defining the first component using a first 3D component model of the first component. The first 3D component model includes the common geometric feature. The common geometric feature is indexed in a database using a unique ID. The method further includes identifying manufacturing process data for the common geometric feature. The manufacturing process data is indexed in the database using the unique ID. The manufacturing data is associated with one or more numerical control manufacturing processes for the common geometric feature of one or more second components. Each of the one or more second components is different than the first component. Each of the one or more second components includes the common geometric feature. The method further includes selecting a numerical control manufacturing process of the one or more numerical control manufacturing processes using the manufacturing process data, obtaining manufacturing process parameters for the selected numerical control manufacturing process, and developing the numerical control manufacturing program for the common geometric feature of the first component. The developed numerical control manufacturing program includes at least some of the manufacturing process parameters.

In any of the aspects or embodiments described above and herein, each of the one or more second components may be represented by a respective 3D second component model. Each respective 3D second component model may be stored in the database. Each respective 3D second component model may include the common geometric feature indexed in the database using the unique ID.

In any of the aspects or embodiments described above and herein, defining the first component using the first 3D component model may include generating a 3D-model representation of the common geometric feature and assigning the unique ID to the 3D-model representation.

In any of the aspects or embodiments described above and herein, the method may further include identifying the common geometric feature of the first component by determining the common geometric feature of the first component is the same as the common geometric feature of the one or more second components based on one or more predetermined similarity rules.

In any of the aspects or embodiments described above and herein, the common geometric feature may be a surface.

In any of the aspects or embodiments described above and herein, the selected numerical control manufacturing process may include one or more of a wire electrical discharge machining (WEDM) process, an abrasive machining process, a broaching process, or a milling process.

In any of the aspects or embodiments described above and herein, the manufacturing process parameters may include one or both of computer-aided manufacturing instructions or numerical control manufacturing instructions for the common geometric feature.

The present disclosure, and all its aspects, embodiments and advantages associated therewith will become more readily apparent in view of the detailed description provided below, including the accompanying drawings.

DETAILED DESCRIPTION

Figure 1:
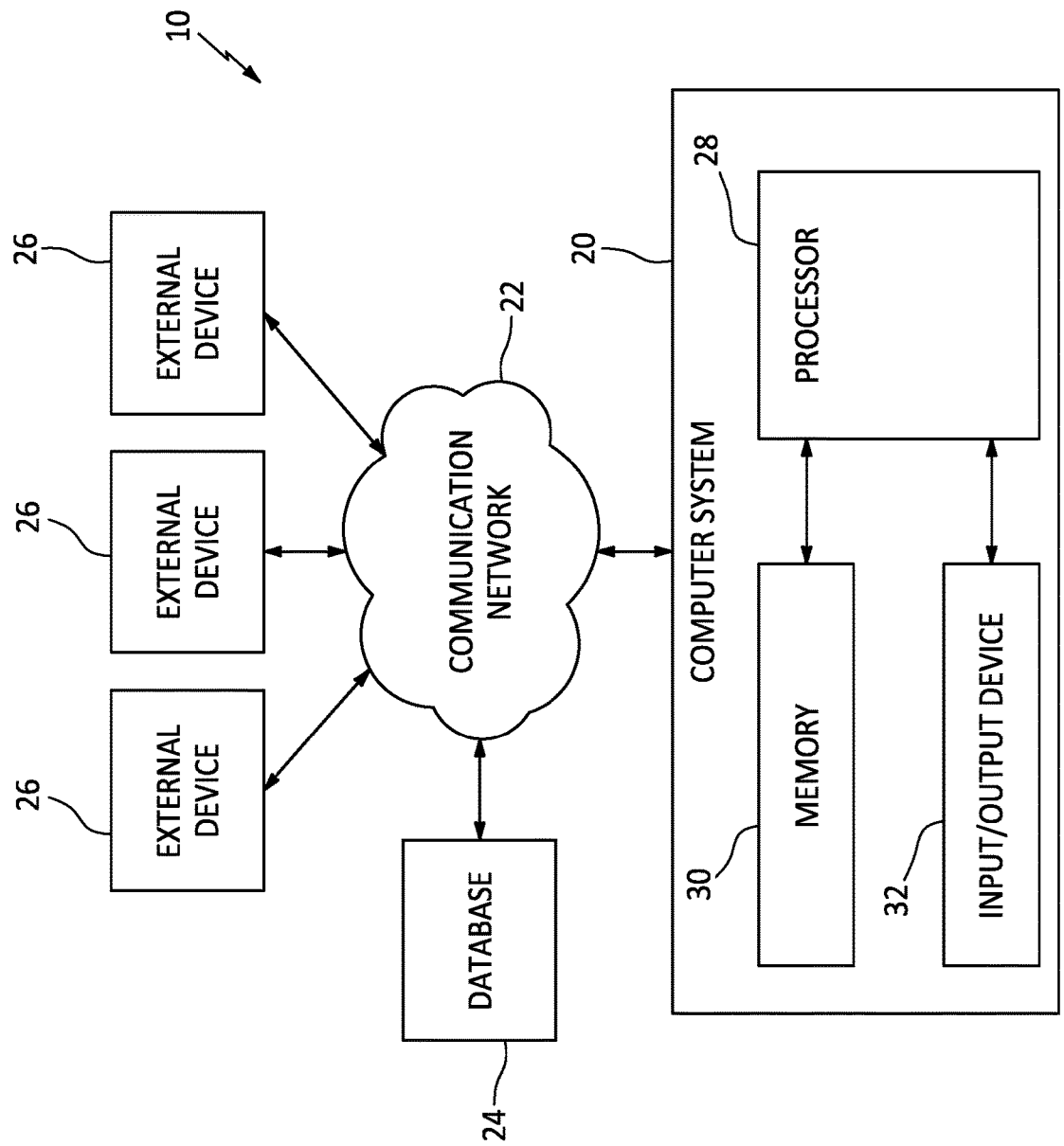
FIG. 1 illustrates a schematic block diagram of an exemplary computer system, in accordance with one or more embodiments of the present disclosure.

FIG. 1 illustrates a diagram of an exemplary computer network 10. The computer network 10 of FIG. 1 includes a computer system 20, a communication network 22, a database 24, and one or more external devices 26. The computer network 10 of FIG. 1 may be configured to implement one or more aspects of the present disclosure, however, the present disclosure is not limited to the particular computer network 10 of FIG. 1. A person of skill in the art will recognize that portions of the computer network 10 may assume various forms (e.g., digital signal processor, analog device, etc.) capable of performing the functions described herein.

The computer system 20 includes a processor 28, memory 30, and one or more input/output devices 32. The processor 28 may include any type of computing device, computational circuit, processor(s), CPU, computer, or the like capable of executing a series of instructions. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the computer system 20 to accomplish the same algorithmically and/or by coordination of device components.

The memory 30 is in signal communication with the processor 28 to allow the processor 28 to execute the series of instructions which are stored in the memory 30. The memory 30 may include a single memory device or a plurality of memory devices; e.g., a computer-readable storage device that can be read, written, or otherwise accessed by a general purpose or special purpose computing device, including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information.

The one or more input/output devices 32 are in signal communication with the processor 28. Communications between the processor 28 and the one or more input/output devices 32 may be via a hardwire connection or via a wireless connection. The one or more input/output devices 32 may include one or more input devices configured, for example, to enable a user to enter data and/or instructions to the computer system 20. Examples of an input device may include, but are not limited to, a keyboard, a mouse, a touchscreen, and a 3D laser scanning system. The one or more input/output devices 32 may additionally or alternatively include one or more output devices configured, for example, to display information or to transfer data from the computer system 20. Examples of an output device may include, but are not limited to, a computer monitor or other optical display, a printer, and audio speakers.

The computer system 20 of the present disclosure may be configured to implement a computer-aided drafting (CAD) and/or a computer-aided manufacturing (CAM) system, platform, and/or software (referred to herein as a "CAD environment") which is capable of generating, manipulating, and assembling three-dimensional (3D) models of an object (e.g., a component) in a simulated 3D space. The present disclosure is not limited to any particular CAD or CAM system, platform, or software. The 3D model may be a mathematical coordinate-based representation of the geometric features of an object in three dimensions. Examples of geometric features may include, but are not limited to, surfaces, edges, vertices, and volumes of an object. The 3D model may be generated algorithmically (e.g., by procedural modeling), by scanning a physical object, or by any other suitable process for obtaining data for representing the 3D shape of an object in the CAD environment. The 3D model may be defined by a solid model or by a shell or boundary model using any suitable representation technique including, but not limited to, boundary definition representation, point cloud representation, and the like.

The communication network 22 of FIG. 1 is configured to facilitate signal communication between the components of the computer network 10 including, for example, the computer system 20, the database 24, and the one or more external devices 26. The communication network 22 may include any suitable electronic communication network or combination of electronic communication networks including, but not limited to, wired and/or wireless local area networks, internet-based networks, cloud-based storage and communication networks, and the like. The communication network 22 may allow remote electronic communications between the computer system 20 and one or more devices such as, but not limited to, the database 24 and/or the one or more external devices 26.

The database 24 may include a single memory device or a plurality of memory devices; e.g., a computer-readable storage device that can be read, written, or otherwise accessed by a general purpose or special purpose computing device, including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The database 24 of FIG. 1 is in signal communication with the components of the computer network 10 such as, but not limited to, the computer system 20 and the one or more external devices 26, via the communication network 22. The database 24 may, thereby, facilitate access to stored instructions and data from multiple components of the computer network 10 such as, but not limited to, the computer system 20 and the one or more external devices 26. The database 24 of FIG. 1 is located external to the computer system 20. Alternatively, the database 24 may be integral to the computer system 20. For example, the database 24 may be integrated with the memory 30.

The one or more external devices 26 may include, for example, one or more computer workstations which may be similar to the computer system 20 of FIG. 1. The one or more external devices 26 may be configured to operate CAD or CAM software capable of generating, manipulating, and assembling three-dimensional (3D) models of an object (e.g., a component) in a simulated 3D space. The one or more external devices 26 may include manufacturing equipment, inspection equipment, and the like. Examples of manufacturing equipment may include additive, subtractive, and/or inspection computer numerical control (CNC) or numerical control (NC) manufacturing equipment such as, but not limited to, multi-axis milling equipment, grinding equipment, turning equipment, drilling equipment, broaching equipment gear cutting equipment wire electrical discharge machining (WEDM) equipment, additive manufacturing equipment, component casting equipment, injection molding equipment, and the like. Examples of inspection equipment may include, but are not limited to, probe inspection equipment, coordinate measuring machines (CMM), optical scanning equipment, laser scanning equipment, pneumatic gauging equipment, and the like. The manufacturing equipment and the inspection equipment may be configured to access or receive the 3D models and perform one or more manufacturing or inspection steps using the information defined by or included with the 3D models.

Figure 2:
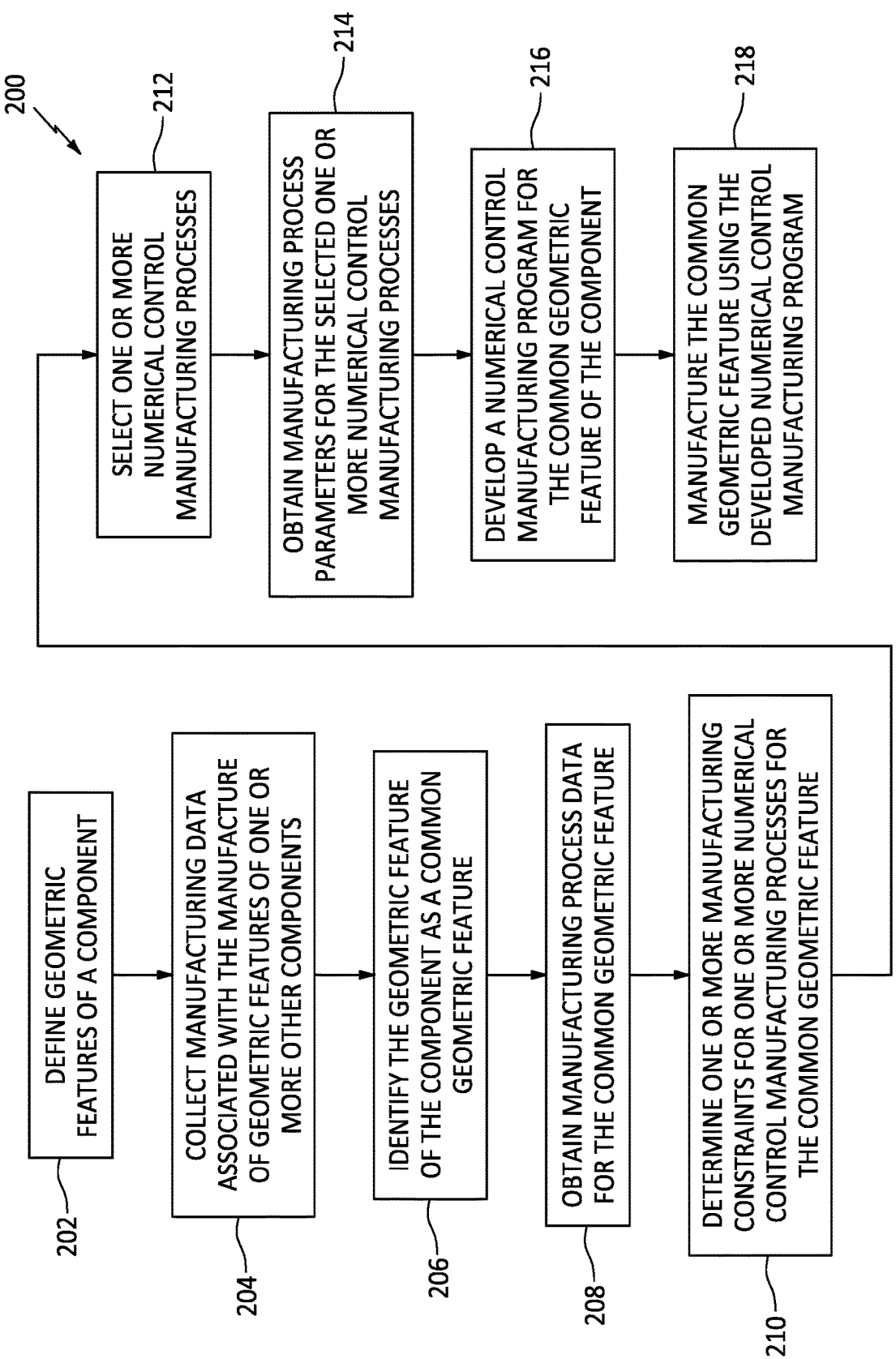
FIG. 2 illustrates a flowchart depicting a method for developing a numerical control manufacturing program for a common geometric feature of a component, in accordance with one or more embodiments of the present disclosure.

Referring to FIGS. 2-9, a method 200 for developing a numerical control manufacturing program for a component is provided. FIG. 2 illustrates a flow chart for the method 200. A component for which the numerical control manufacturing program is developed in accordance with the method 200 may be referred to herein as a "development component." Alternatively, components which have been previously manufactured or developed may be referred to herein as "historical components." As will be discussed in further detail, manufacturing data associated with the historical components may be used in the development of the numerical control manufacturing program for the development component. The development component and the historical components may also be referred to generally herein as a "component" or "components." For ease of description, the method 200 is described below with reference to the computer network 10 of FIG. 1. For example, the memory 30 may include instructions which, when executed by the processor 28, cause the computer system 20 or its processor 28 to perform one or more steps of the method 200. The method 200, however, may alternatively be performed with other computer network or computer system configurations. Unless otherwise noted herein, it should be understood that the steps of method 200 are not required to be performed in the specific sequence in which they are discussed below and, in various embodiments, the steps of method 200 may be performed separately or simultaneously. Further, it should be understood that not all of the steps of the method 200, discussed below, may be required unless otherwise described herein.

Figure 3:
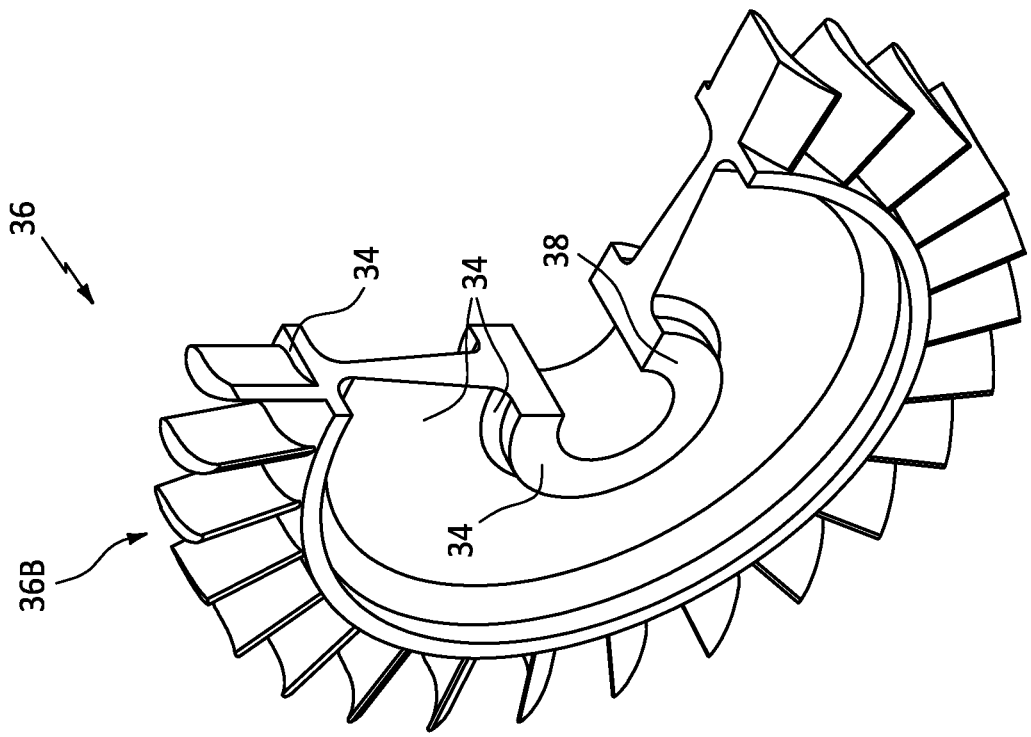
FIG. 3 illustrates a cutaway, perspective views of exemplary components, in accordance with one or more embodiments of the present disclosure.
Figure 3:
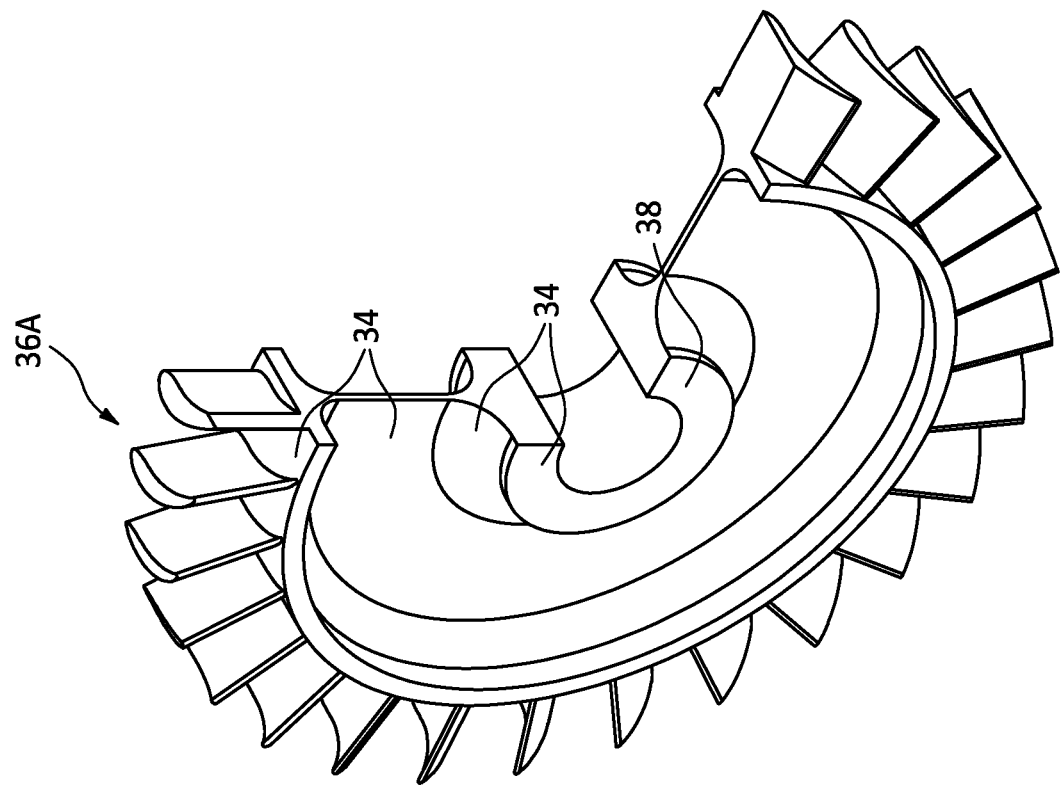

Step 202 includes defining one or more geometric features 34 of a component 36. FIG. 3 illustrates cutaway, perspective views of exemplary components 36 including a first component 36A and a second component 36B. The first component 36A and the second component 36B of FIG. 3 are bladed disks (e.g., rotors) which may be used, for example, in a compressor or turbine of a gas turbine engine. However, it should be understood that the present disclosure is not limited to any particular type of component 36. Each component 36, such as the first component 36A and the second component 36B, includes a plurality of geometric features 34. The geometric features 34 may include, but are not limited to, surfaces, edges, points, lines, planes, volumes, etc. of the component 36, 36A, 36B. For ease of description, the geometric features 34 may be described herein with respect to surfaces, however, it should be understood that geometric features 34 according to the present disclosure may include other types of component geometric features, for example, as described above.

As can be seen in FIG. 3, the first component 36A and the second component 36B are different from one another. In other words, the first component 36A includes one or more geometric features 34 which are different from or otherwise not included in the second component 36B, and vice versa. However, the first component 36A and the second component 36B also include one or more geometric features 34 which are common to both the first component 36A and the second component 36B; e.g., one or more common geometric features 38. Each geometric feature 34 of a component 36 may be unique to the particular component 36 or may be common to two or more different components 36. As used herein, the term "common geometric feature" refers to a geometric feature 34 (e.g., a surface) of a component 36 or component model (e.g., a 3D CAD model of a component) which is the same as or similar to another geometric feature 34 of another different component 36 or component model, based on one or more predetermined similarity rules. For example, the common geometric feature 38 may include one or more geometric feature characteristics (e.g., diameter, thickness, width, etc.) which are the same or within a predetermined geometric characteristic threshold for two or more different components 36. The common geometric feature 38 may additionally or alternatively be determined or otherwise identified based on similar geometric feature characteristics such as, but not limited to, fit, form, function, position, tolerance, surface finish, geometric feature angles, radius of curvature, etc. for two or more different components 36. The common geometric feature 38 of two or more components 36 may be defined by a geometric feature characteristic such as a common (e.g., same) material or materials (e.g., metal, metal alloy, composite material, etc.) for the common geometric feature 38. The common geometric feature 38 for two or more different components 36 may be identical or substantially identical. Any number of the geometric features 34 of a component 36 may be identified as common geometric features 38.

Figure 4:
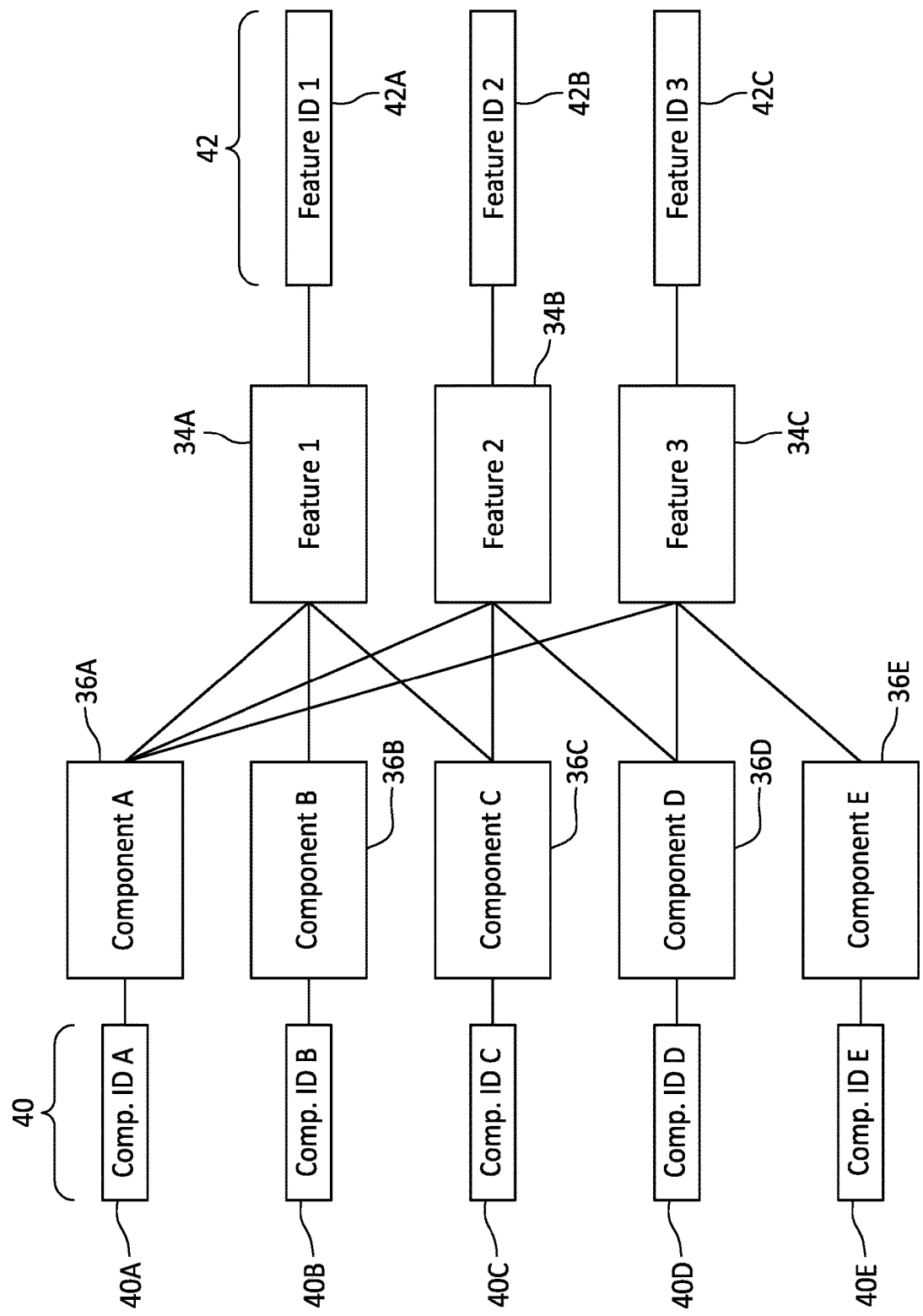
FIG. 4 illustrates block diagram depicting an exemplary relationship between a series of exemplary components, in accordance with one or more embodiments of the present disclosure.

FIG. 4 illustrates a block diagram depicting an exemplary relationship between a series of exemplary components 36A-E. Each of the components 36A-E may be identified by a component ID 40 (e.g., a part number), which component ID 40 may identify a particular component design with which the respective component 36A-E is associated. For example, the components 36A-E of FIG. 4 are each identified by a respective component ID 40A-E. Components 36A, 36B, and 36C each include a first geometric feature 34A. The first geometric feature 34A, therefore, is a common geometric feature for components 36A, 36B, and 36C. Components 36D and 36E do not include the first geometric feature 34A. Components 36A, 36C, and 36D each include a second geometric feature 34B. The second geometric feature 34B, therefore, is a common geometric feature for components 36A, 36C, and 36D. Components 36B and 36E do not include the second geometric feature 34B. Components 36A, 36D, and 36E each include a third geometric feature 34C. The third geometric feature 34C, therefore, is a common geometric feature for components 36A, 36D, and 36E. Components 36B and 36C do not include the third geometric feature 34C. Each geometric features 34 may be identified by a unique ID 42, which unique ID 42 is unique to the respective geometric feature 34. For example, each of the geometric features 34A-C of FIG. 4 is identified by a respective unique ID 42A-C.

As can be understood from FIG. 4, the occurrence of manufacturing processes to form certain geometric features 34 (e.g., common geometric features 38) of components 36 may be significantly more common than occurrences of performing manufacturing processes on a particular component 36. This is because a common geometric feature 38 may be found in a large number of different components 36. For example, manufacture of any of the components 36A, 36B, and 36C of FIG. 4 would include one or more manufacturing processes for forming the first geometric feature 34A. Accordingly, manufacturing information associated with a common geometric feature 38 (e.g., the first geometric feature 34A for components 36A-C) may be relevant to the manufacture of any component 36 which includes the common geometric feature 38. For example, a newly designed component 36, for which manufacturing processes have not yet been developed, may include one or more common geometric features 38. Manufacturing information associated with the one or more common geometric features 38 may be used in the development of manufacturing processes for the newly designed component 36.

Each geometric feature 34 of a component 36 may be identified and described based on the one or more geometric feature characteristics of each geometric feature 302. For example, each geometric feature 34 may be assigned the unique ID 42, as discussed above. However, other geometric feature characteristics (e.g., diameter, thickness, width, function, etc.) may be used for identification of a geometric feature 34. Defining each geometric feature 34 may include indexing each geometric feature 34 of a component 36. Each geometric feature 34 may be indexed using the unique ID 42 for that geometric feature 34. Indexing each geometric feature 34 may allow common geometric features 38 to be identified for two or more different components 36. For example, the component 36A and the different component 36B of FIG. 4 each include the geometric feature 34A (e.g., a common geometric feature 38) having the unique ID 42A. In this way, a common geometric feature 38 (e.g., geometric feature 34A) may be identified and tracked between multiple different components 36 (e.g., components 36A, 36B). Defining a common geometric feature 38, for example, by indexing and/or describing the geometric features 34 for a component 36, may additionally or alternatively be accomplished using an industrial standard such as the Quality Information Framework (QIF) and/or using Universally Unique Identifiers (UUID), however, the present disclosure is not limited to any particular standard or system for defining or indexing geometric features 34.

In some embodiments, Step 202 may include generating, providing, or otherwise obtaining one or more 3D component models 44 in a CAD environment, which CAD environment may be implemented by the computer system 20 (see FIG. 1). The 3D component models 44 may be representative of respective components 36. Generation of the 3D component models 34 in the CAD environment may be performed as part of a design process for components 36 and/or an apparatus that includes the components 36. The 3D component models 44 may be stored, for example, in the database 24 and/or memory 30 for access by one or more components of the computer network 10 (see FIG. 1).

Figure 5:
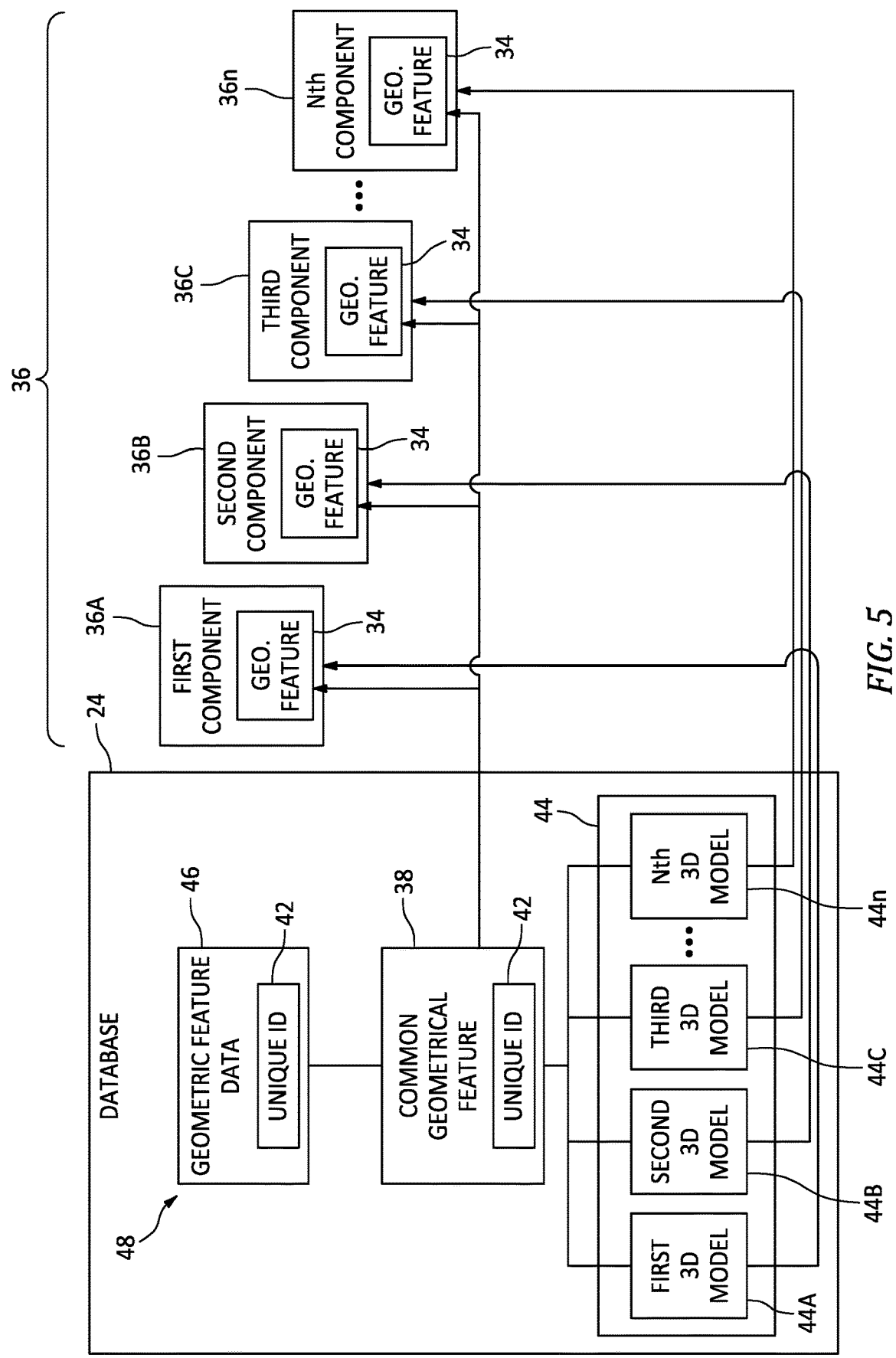
FIG. 5 illustrates a schematic block diagram including portions of the computer system of FIG. 1 and a plurality of components, in accordance with one or more embodiments of the present disclosure.

FIG. 5 illustrates a schematic block diagram describing an exemplary relationship between a common geometric feature 38, components 36 (e.g., components 36A-n), 3D component models 44 (e.g., 3D component models 44A-n), and geometric feature data 46. The 3D component models 44A-n of FIG. 5 are stored in the database 24. Each of the 3D component models 44A-n of FIG. 5 share the common geometric feature 38. The common geometric feature 38 is identified and indexed using the unique ID 42. Geometric feature data 46 (e.g., geometric feature characteristics, manufacturing data, etc.) for the common geometric feature 38 may be stored as a data set 48 in the database 24. The dataset 48 is linked with the common geometric feature 38 using the unique ID 42. Each of the 3D component models 44A-n is representative of a respective different component 36A-n. Each of the different components 36A-n of FIG. 5 include the common geometric feature 38. The present disclosure is not limited to the particular relationship between the common geometric feature 38, the components 36, the 3D component models 44, and the geometric feature data 46, as illustrated in FIG. 5.

Figure 6:
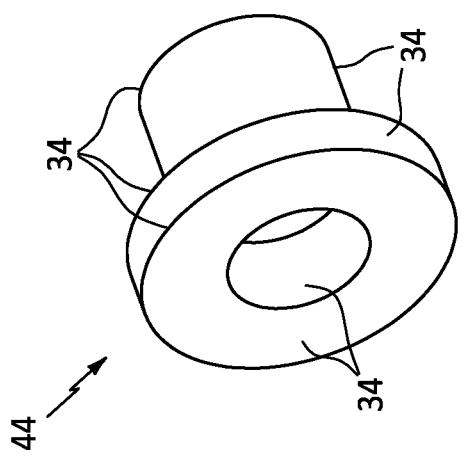
FIG. 6 illustrates a perspective view of a 3D component model, in accordance with one or more embodiments of the present disclosure.

FIG. 6 illustrates a perspective view of an exemplary 3D component model 44. The 3D component model 44 of FIG. 6 includes geometric features 34. The geometric features 34 of FIG. 6 include surfaces and edges of the 3D component model 44. The geometric features 34 of the present disclosure, however, are not limited to component model surfaces and edges.

Figure 7:
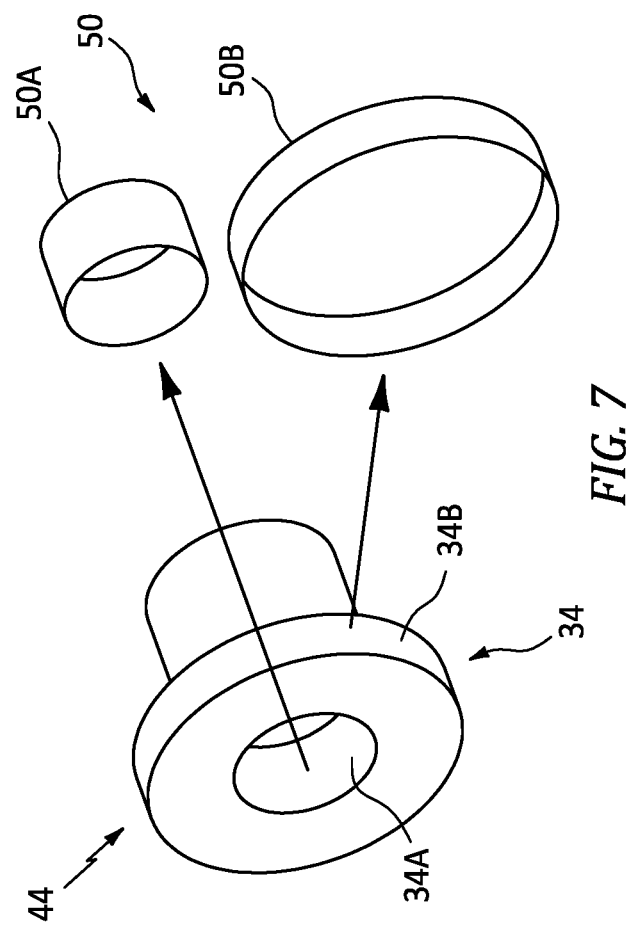
FIG. 7 illustrates perspective views of 3D surface representation models extracted from surfaces of the 3D component model of FIG. 6, in accordance with one or more embodiments of the present disclosure.

FIG. 7 illustrates a perspective view of the exemplary 3D component model 44 of FIG. 6 and 3D geometric feature representation models 50. In some embodiments, Step 202 may include extracting geometric feature information from a 3D component model 44 (e.g., the 3D component model 44 of FIG. 6) and generating one or more 3D geometric feature representation models 50. Each 3D geometric feature representation model 50 may be a representation of a respective geometric feature 34 of a 3D component model 44, such as the 3D component model 44 of FIGS. 6 and 7. As an example, the plurality of geometric features 34 of the 3D component model 44 of FIG. 7 includes a first geometric feature 34A (e.g., a surface) and a second geometric feature 34B (e.g., a surface). Geometric feature information of the 3D component model 44 for the first geometric feature 36A may be extracted to generate a first 3D geometric feature representation model 50A which is representative of the first geometric feature 34A. Similarly, geometric feature information of the 3D component model 44 for the second geometric feature 34B may be extracted to generate a second 3D geometric feature representation model 50B which is representative of the second geometric feature 34B. The 3D geometric feature representation models 50 may be generated in the CAD environment and may be unique models which are independent of the associated 3D component model 44. The 3D geometric feature representation models 50 may be stored, for example, in the database 24 or memory 30 independent of the associated 3D component model 44.

Figure 8:
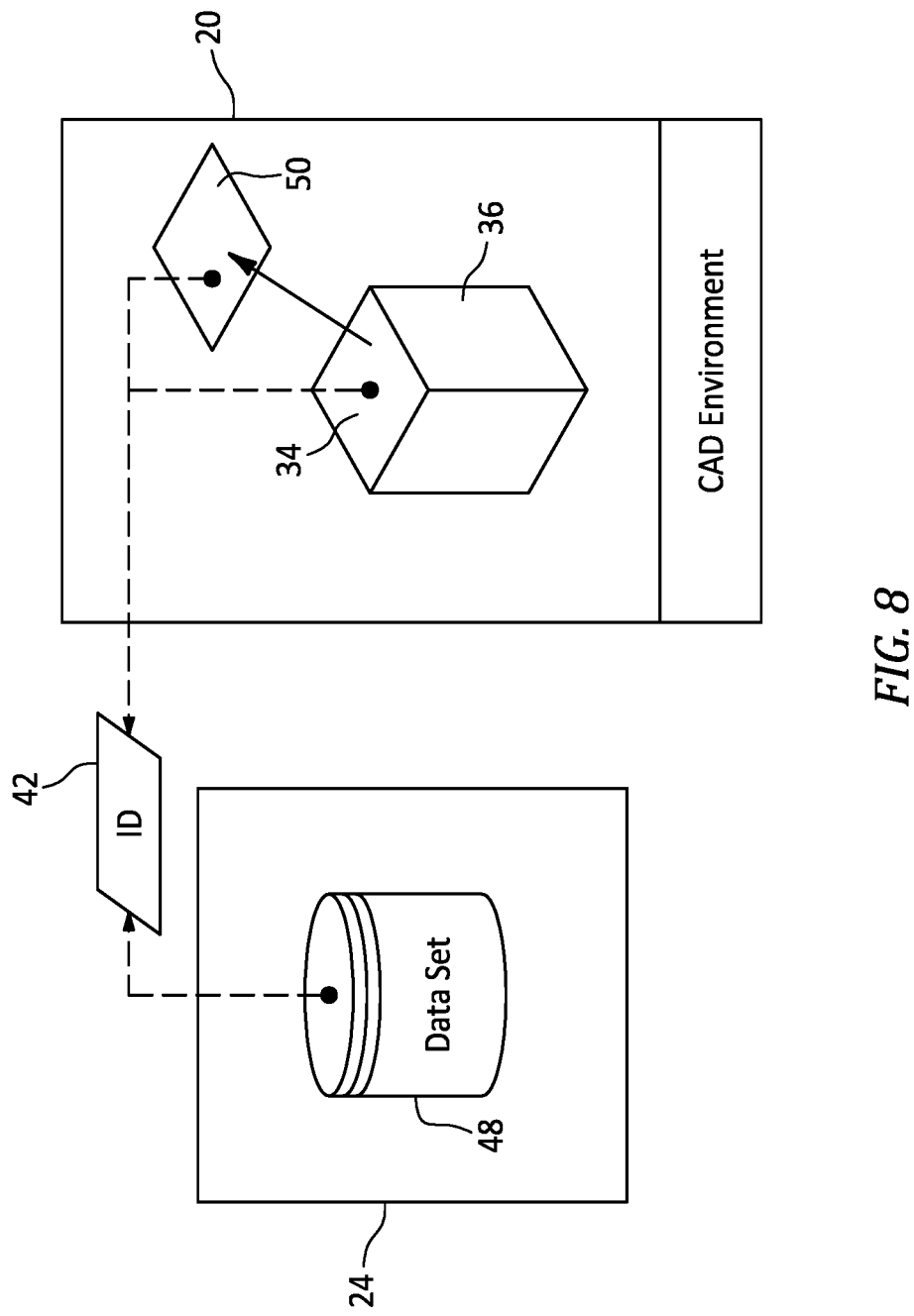
FIG. 8 illustrates a block diagram of a portion of the computer network of FIG. 1 including a 3D component model, in accordance with one or more embodiments of the present disclosure.

As shown in FIG. 8, and discussed above, geometric feature data 46 (see FIG. 5) associated with a geometric feature 34 may be stored in a data set 48 which is linked to the unique ID 42 for the geometric feature 34. The data set 48 may additionally or alternatively be linked with a 3D geometric feature representation model 50 for the respective geometric feature 34 by the unique ID 42. FIG. 8 illustrates a block diagram depicting an exemplary relationship between the geometric feature 34 of a 3D component model 44 in the CAD environment of the computer system 20 and the data set 48 stored in the database 24. The geometric feature 34 and the data set 48 of FIG. 8 are linked by the unique ID 42. The 3D geometric feature representation model 50 of FIG. 8 is additionally linked to the data set 48 by the unique ID 42. Each geometric feature 34 for each 3D component model 44 may be linked to a respective data set 48 by a respective unique ID 42.

In Step 204, manufacturing data for a common geometric feature 38 may be collected. The manufacturing data may be collected, for example, during, after, or in connection with the performance of one or more manufacturing processes for the common geometric feature 38 on one or more historical components 36. The manufacturing data for the common geometric feature 38 may be stored with the geometric feature data 46 in the data set 48 for the common geometric feature 38 (see FIG. 5). Manufacturing data for each geometric feature 34 (e.g., which may or may not be a common geometric feature 38) of a component 36 may be collected during the manufacturing of the geometric feature 34 on a respective component 36. Because the common geometric feature 38 may be indexed (e.g., using a unique ID 42), as discussed above, the manufacturing data for a common geometric feature 38 may be collected and retained across a plurality of different components 36, which plurality of different components 36 include the common geometric feature 38. Manufacturing data may include any useful data associated with the common geometric feature 38. The manufacturing data may be collected during manufacturing of a component 36 including the common geometric feature 38. The manufacturing data may include manufacturing process data for the common geometric feature 38. The manufacturing process data may be data which is descriptive of or includes characteristics of a particular manufacturing process as a whole, for a given manufacturing process and the common geometric feature 38. The manufacturing process data may include, for example, a manufacturing cost associated with a manufacturing process for the common geometric feature 38. The manufacturing process data may include, for example, a manufacturing cycle time (e.g., an average time to perform) a manufacturing process for the common geometric feature 38. The manufacturing process data may include, for example, a preferred manufacturing facility or a preferred manufacturer for a component 36 including the common geometric feature 38.

The manufacturing process data may also include, for example, process capability (Cpk) data and/or process performance (Ppk) data associated with a manufacturing process for the common geometric feature 38. The Cpk is a statistical tool which may be used to measure the ability of a manufacturing process to produce components or component geometric features within specification limits with a high confidence. Ppk is another statistical tool which may be used to determine how the actual manufacturing process has performed over a period of time with respect to producing components or component geometric features within specification limits with a high confidence. For example, a Cpk or Ppk value of 1.33 for the common geometric feature 38 may indicate that 99.99% of instances of the common geometric feature 38 are within or likely to be within specification limits, a Cpk or Ppk value of 1.2 for the common geometric feature 38 may indicate that 99.97% of instances of the common geometric feature 38 are within or likely to be within specification limits, a Cpk or Ppk value of 1.0 for the common geometric feature 38 may indicate that 99.7% of instances of common geometric feature 38 are within or likely to be within specification limits, etc. A Cpk or Ppk value above a predetermined threshold value may confirm that the manufacturing process for the common geometric feature 38 is acceptable for use in manufacturing the common geometric feature 38.

The manufacturing data may include product manufacturing information (PMI). The PMI may include geometric dimensioning and tolerancing (GD&T) information for the common geometric feature 38. The GD&T information may describe the nominal geometry of the common geometric feature 38 and the allowable manufacturing tolerance variation for the common geometric feature 38. The GD&T information may describe geometric characteristics for a geometric feature 36. Examples of GD&T information include geometric characteristics of the common geometric feature 38 such as, but not limited to, dimensions (e.g., length, width, height), flatness, circularity, cylindricity, angularity, concentricity, coincidence, parallelism, perpendicularity, and the like, as well as acceptable manufacturing tolerance limits for each geometric characteristic. The GD&T information may conform to one or more GD&T standards including, but not limited to, the American Society of Mechanical Engineers (ASME) Y14.5 standard, the International Organization for Standardization (ISO) standard, and the like. The PMI may include functional and/or contextual information for common geometric feature 38 such as, but not limited to, stress peak area, airflow direction along the common geometric feature 38, stack-up information (e.g., bearing stack-up information), design notes, etc. The PMI may include life cycle information for the common geometric feature 38, such as, but not limited to, repair history, failure history, inspection history, and/or information gathered during component and/or equipment operation which may be used for future part design.

The manufacturing data may include manufacturing process parameters for a manufacturing process for the common geometric feature 38. The manufacturing process parameters may include or describe functional details of a manufacturing process and its performance on the common geometric feature 38. For example, the manufacturing process parameters may include one or more steps of the manufacturing process for the common geometric feature 38. The manufacturing process parameters may include, for example, computer-aided manufacturing (CAM) and/or numerical control (NC) manufacturing instructions for the common geometric feature 38. Computer-aided manufacturing and/or numerical control manufacturing instructions may include computer-readable instructions which, when executed by one or more numerically-controlled manufacturing devices (e.g., additive, subtractive, and/or inspection numerically-controlled manufacturing devices), cause the one or more numerically-controlled manufacturing devices to execute one or more manufacturing processes for the common geometric feature 38. Execution of the numerical control manufacturing instructions may cause one or more numerically-controlled manufacturing devices to execute positioning, movement, and/or coordinated manufacturing operations by means of program data in numerical form (e.g., numerical coordinates). For example, the numerical control manufacturing instructions may be in the form of computer numerical control (CNC) G-code or M-code. The manufacturing process parameters may additionally or alternatively include characteristics of the manufacturing process steps or sequence such as, but not limited to, manufacturing sequences, machine tool paths, machining depths, additive manufacturing build heights, inspection probe coordinates and acceptability tolerances, and the like. The manufacturing process parameters may additionally or alternatively include structural or operational characteristics of the manufacturing equipment configured to execute the manufacturing process such as, but not limited to, tool force, torque, power, deflection, temperature, speed, feed rate, vibration, tool coolant temperatures and coolant flow requirements, tooling specifications (e.g., size and/or diameter), and the like.

Step 206 includes identifying whether a geometric feature 34 of a development component 36 is a common geometric feature 38. Identification of the geometric features 34 of the development component 36, for Step 206, may be performed for each geometric feature 34 of the development component 36. Identifying whether a geometric feature 34 of the development component 36 is a common geometric feature may include, for example, querying the database 24 (e.g., the geometric feature data 46) to determine whether a same or similar geometric feature 34 has been previously manufactured or otherwise developed (e.g., on a different historical component 36), based on one or more predetermined similarity rules. If a same or similar geometric feature 34 can be identified (e.g., in the database 24), the geometric feature 34 of the development component 36 is a common geometric feature 38. Querying the database 24 may include, for example, searching for one or more geometric features 34 based on geometric feature characteristics of the geometric feature 34 of the development component 36. Querying the database 24 may additionally or alternatively include, for example, search for one or more geometric features 34 which have been indexed using the unique ID 42 for the geometric feature 34 of the development component 36. Step 206 may additionally include determining that a geometric feature 34 of a development component 36 is not a common geometric feature 38, for example, because no other same or similar geometric features 34 can be identified, based on the predetermined similarity rules. In the event that a geometric feature 34 of a development component 36 is not a common geometric feature 38, a numerical control manufacturing program may be developed for the particular geometric feature 34 using convention practices.

In Step 208, manufacturing process data for the identified common geometric feature 38 of the development component 34 may be obtained. The manufacturing process data may associated with one or more numerical control manufacturing processes which have been used in the manufacture of the common geometric feature 38. As described above, the manufacturing process data for a geometric feature 34 may be included in the geometric feature data 46 stored in the database 24 for each geometric feature 34, for example, as a data set 48. The manufacturing process data may be obtained from the data set 48 indexed (e.g., using a unique ID 42) to the particular geometric feature 34 which is the common geometric feature 38 of the development component 34.

In Step 210, one or more manufacturing constraints may be determined for selecting a numerical control manufacturing process for the development component 36. A manufacturing constraint may be understood as a required algorithm condition for a numerical control manufacturing process to be considered acceptable (e.g., a valid solution) for manufacture of the common geometric feature 38 of the development component 36. The manufacturing constraints may define one or more thresholds for the obtained manufacturing process data corresponding to one or more numerical control manufacturing processes for the common geometric feature 38 of the development component 34. The manufacturing constraints may be determined by a user and/or may include predetermined (e.g., default) manufacturing constraints. Examples of manufacturing constraints may include, but are not limited to, a manufacturing cost threshold, a manufacturing cycle time threshold, a geometric tolerance threshold, a process capability (Cpk) threshold, a process performance (Ppk) threshold, a preferred manufacturing facility, and/or a preferred manufacturer.

In Step 212, one or more numerical control manufacturing processes may be selected for the common geometric feature 38 of the development component 34 using the manufacturing constraints. Manufacturing process data for a numerical control manufacturing process may be evaluated using the manufacturing constraints to determine whether the numerical control manufacturing process may be acceptable for the common geometric feature 38 of the development component 34. More than one numerical control manufacturing process may be necessary for manufacture of a particular geometric feature 34 (e.g., where more than one additive, subtractive, or inspection process may be used). In some cases, multiple acceptable numerical control manufacturing processes may be identified and selection of one of the multiple acceptable numerical control manufacturing processes may be necessary. For example, a user may be prompted to select one of the multiple acceptable numerical control manufacturing processes. Alternatively, an acceptable numerical control manufacturing process may be automatically selected (e.g., by the computer system 20) based on a best fit of the manufacturing process data as applied to the manufacturing constraints. In the event that no acceptable numerical control manufacturing processes can be identified for the common geometric feature 38 of the development component 34 using the manufacturing constraints, manufacturing constraints for the common geometric feature 38 may be re-determined. Alternatively, a numerical control manufacturing program may be developed for the common geometric feature 38 using convention practices.

In Step 214, manufacturing process parameters may be obtained for the one or more selected numerical control manufacturing processes. The manufacturing process parameters for the selected one or more numerical control manufacturing processes may be included in the geometric feature data 46 stored in the database 24 for each geometric feature 34, for example, as a data set 48. The manufacturing process data may be obtained from the data set 48 indexed (e.g., using a unique ID 42) to the particular geometric feature 34 which is the common geometric feature 38 of the development component 34.

In Step 216, the numerical control manufacturing program from the common geometric feature 38 of the development component 34 may be developed using the manufacturing process parameters for the selected one or more numerical control manufacturing processes. The developed numerical control manufacturing program may include all or substantially all of the manufacturing process parameters for the selected one or more manufacturing processes for the common geometric feature 38. Accordingly, the developed numerical control manufacturing program may include instructions which, when executed by one or more numerical control manufacturing devices, cause the one or more numerically-controlled manufacturing devices to execute the selected one or more numerical control manufacturing processes (or similar numerical control manufacturing processes) to manufacture the common geometric feature 38 of the development component 34. By using manufacturing data collected from the manufacture of similar geometric features (e.g., common geometric features), the time and cost associated with development of a numerical control manufacturing program for a geometric feature of a development component, and hence the development component itself, may be substantially reduced. In some cases, development of the numerical control manufacturing program from the common geometric feature 38 of the development component 34 may include additional modification. For example, the numerical control manufacturing program may be modified (e.g., by a user) to accommodate differences such as, but not limited to, tooling path differences, material differences, surface finish differences, material microstructure differences, and the like, between the common geometric feature 38 of the development component 36 and respective common geometric features 38 of one or more historical components 36.

In Step 218, the common geometric feature 38 of the development component 36 may be manufactured using the developed numerical control manufacturing program. The developed numerical control manufacturing program may be executed to implement one or more of an additive manufacturing process, a subtractive manufacturing process, an inspection manufacturing process, and/or any other manufacturing process, for example, which directly or indirectly affects a surface and/or material of a component, as previously discussed. For example, the executed numerical control manufacturing program may include a machining process such as, but not limited to, one or more of a turning process, a milling process, a grinding process, a drilling process, a broaching process, a gear cutting process, a wire electrical discharge machining (WEDM) process, an additive manufacturing process, a casting process, an injection molding process, a probe inspection process, etc. The common geometric feature 38 of the development component 36 may undergo a series of machining, finishing, and inspection steps during execution of the developed numerical control manufacturing process. The present disclosure is not limited to any particular manufacturing process or series of manufacturing processes. In some embodiments, Step 218 may further include collecting the manufacturing process data for the common geometric feature 38 while manufacturing the common geometric feature 38 using the developed numerical control manufacturing program. The collected manufacturing process data may be stored in the database 24 and associated with the common geometric feature 38 using the unique ID 42.

Figure 9:
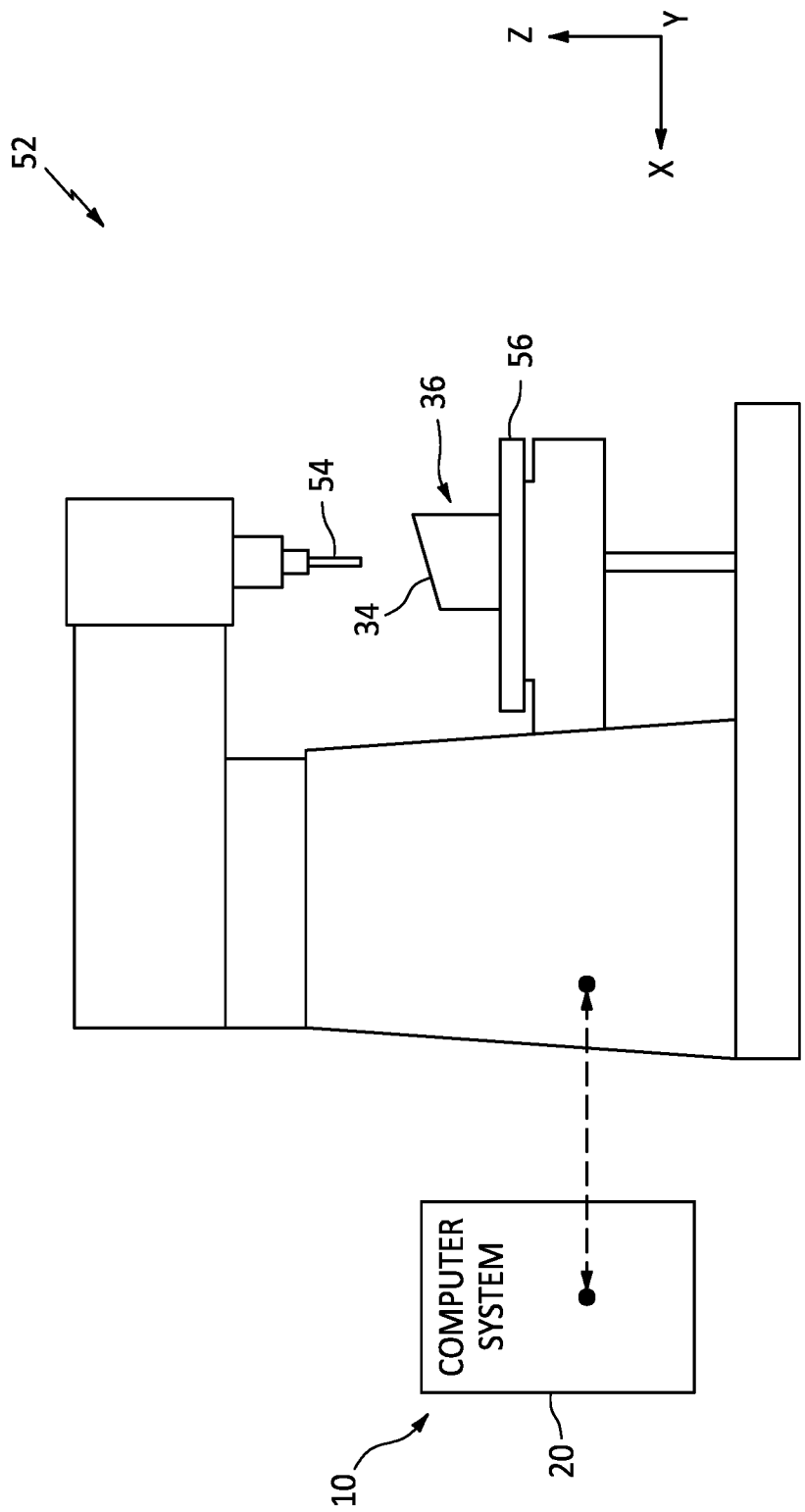
FIG. 9 illustrates a schematic view of a numerically-controlled manufacturing device, in accordance with one or more embodiments of the present disclosure.

The common geometric feature 38 of the development component 36 may be manufactured using one or more manufacturing devices configured to execute the developed numerical control manufacturing program. FIG. 9 illustrates a schematic view of an exemplary numerically-controlled manufacturing device 52 configured to execute the developed numerical control manufacturing program. The numerically-controlled manufacturing device 52 of FIG. 9 includes a machining tool 54 and a platform 56. The platform 56 is configured to support the component 36 with one or more geometric features 34 (e.g., the common geometric feature 38) to be manufactured. The numerically-controlled manufacturing device 52 may be configured to translate and/or rotate the machining tool 54 about one or more axes including, but not limited to, the X-axis, the Y-axis, and the Z-axis, in response to execution of the numerical control manufacturing program. The present disclosure, however, is not limited to exemplary numerically-controlled manufacturing device 52 of FIG. 9. In some embodiments, the numerically-controlled manufacturing device 52 may be included with and/or in signal communication with the computer network 10 and/or the computer system 20 and may be configured to receive the numerical control manufacturing program from the computer network 10 and/or the computer system 20, as shown in FIG. 9. However, the present disclosure is not limited to any particular configuration of the numerically-controlled manufacturing device 52 for receiving the numerical control manufacturing program.

Steps 206-218 may be repeated for each geometric feature 34 of the development component 36. For example, the database 24 may be queried for each geometric feature 34 of the development component 36 to determine if the geometric feature 34 is a common geometric feature 38 (see, e.g., FIG. 5). For identified common geometric features 38 of the development component 36, previously collected and stored geometric feature data 46 (e.g., manufacturing data) may be used to develop a numerical control manufacturing program for each common geometric feature 38 of the development component 36.

Figure 10:
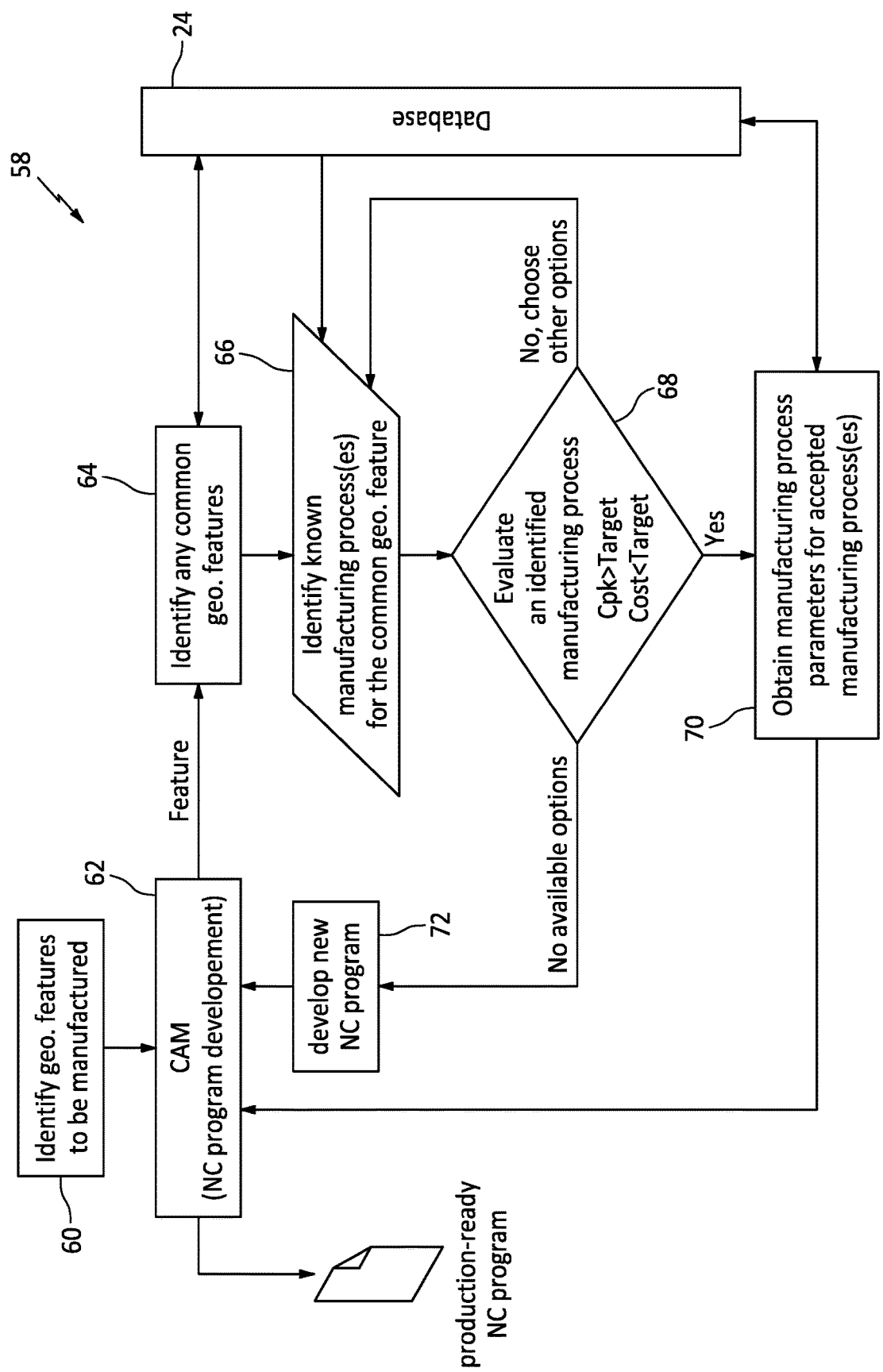
FIG. 10 illustrates a flowchart for an exemplary application of the method of FIG. 3, in accordance with one or more embodiments of the present disclosure.

Referring to FIG. 10, an exemplary application of the method 200 is illustrated in the flowchart 58. Geometric features of a component are defined or identified (flowchart block 60) for use in the development of a numerical control manufacturing program (e.g., a CAM program) (flowchart block 62). Each of the geometric features are evaluated to determine if the geometric features are common geometric features (flowchart block 64), for example, by querying the database 24. For any identified common geometric features of the component, known numerical control manufacturing processes, and the manufacturing process data associated therewith and stored in the database 24, are identified (flowchart block 66). The known numerical control manufacturing processes are evaluated, using the manufacturing constraints, to determine acceptability for manufacture of each particular common geometric feature of the component (flowchart block 68). For example, flowchart block 68 of FIG. 10 includes determining whether a process capability (Cpk) value of a numerical control manufacturing process is greater than a predetermined target Cpk threshold and determining whether a cost associated with the numerical control manufacturing process is less than a predetermined target cost threshold. Manufacturing process parameters are obtained from the database for each accepted manufacturing process (flowchart block 70). The manufacturing process parameters may be used to develop the numerical control manufacturing process for the common geometric feature (see flowchart block 62). In the event that no manufacturing process is determined to be acceptable for a common geometric feature, the numerical control manufacturing program for that common geometric feature may be developed using conventional processes (flowchart block 72). Similarly, numerical control manufacturing programs for geometric features which are not identified as common geometric features may be developed using conventional processes.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. A computer-implemented method for developing a numerical control manufacturing program for a common geometric feature of a first component, the method comprising:
    obtaining manufacturing process data for the common geometric feature, the manufacturing process data associated with one or more numerical control manufacturing processes for the common geometric feature of one or more second components, each of the one or more second components different than the first component, each of the one or more second components including the common geometric feature;
    determining one or more manufacturing constraints for the numerical control manufacturing program for the common geometric feature of the first component;
    selecting a numerical control manufacturing process of the one or more numerical control manufacturing processes by evaluating the manufacturing process data for each numerical control manufacturing process of the one or more numerical control manufacturing processes using the one or more manufacturing constraints, wherein the one or more manufacturing constraints include one or more of a process capability (Cpk) threshold, a process performance (Ppk) threshold, a manufacturing cost threshold, a cycle time threshold, a preferred manufacturing site, or a preferred manufacturer;
    obtaining manufacturing process parameters for the selected one or more numerical control manufacturing processes;
    developing the numerical control manufacturing program for the common geometric feature of the first component, the developed numerical control manufacturing program including the manufacturing process parameters;
    indexing the common geometric feature in a database by assigning the common geometric feature a unique ID;
    storing the manufacturing process data and the manufacturing process parameters associated with the common geometric feature of the one or more second components as a dataset in the database and assigning the unique ID to the dataset; and
    manufacturing the common geometric feature of the first component using the developed numerical control manufacturing program.

2. The method of claim 1, further comprising collecting the manufacturing process data for the common geometric feature while manufacturing the common geometric feature using the developed numerical control manufacturing program.

3. The method of claim 1, wherein the common geometric feature is a surface.

4. The method of claim 1, wherein the selected numerical control manufacturing process includes one or more of a wire electrical discharge machining (WEDM) process, an abrasive machining process, a broaching process, or a milling process.

5. The method of claim 1, wherein the manufacturing process parameters include one or both of computer-aided manufacturing instructions or numerical control manufacturing instructions for the common geometric feature.

6. The method of claim 1, wherein the one or more manufacturing constraints include one or more of a process capability (Cpk) threshold, a process performance (Ppk) threshold, or a manufacturing cost threshold.

7. The method of claim 1, wherein the manufacturing process data includes geometric dimensioning and tolerancing (GD&T) information of the common geometric feature.

8. The method of claim 7, wherein the GD&T information includes geometric characteristics comprising one or more of a dimension, a flatness, a circularity, a cylindricity, an angularity, a concentricity, a coincidence, a parallelism and a perpendicularity.

9. A system for developing a numerical control manufacturing program for a common geometric feature of a first component, the system comprising:
    a processor;
    a database in signal communication with the processor, the database storing manufacturing process data and manufacturing process parameters;
    a numerically-controlled manufacturing device;
    a non-transitory memory in signal communication with the processor, the non-transitory memory storing instructions which, when executed, cause the processor to:
        obtain the manufacturing process data for the common geometric feature, the manufacturing process data associated with one or more numerical control manufacturing processes for the common geometric feature of one or more second components, each of the one or more second components different than the first component, each of the one or more second components including the common geometric feature;
        obtain one or more manufacturing constraints for the numerical control manufacturing program for the common geometric feature of the first component;
        select a numerical control manufacturing process of the one or more numerical control manufacturing processes by evaluating the manufacturing process data for each numerical control manufacturing process of the one or more numerical control manufacturing processes using the one or more manufacturing constraints, wherein the one or more manufacturing constraints includes one or more of a process capability (Cpk) threshold, a process performance (Ppk) threshold, a manufacturing cost threshold, a cycle time threshold, a preferred manufacturing site, or a preferred manufacturer;
        obtain the manufacturing process parameters for the selected numerical control manufacturing process;
        develop the numerical control manufacturing program for the common geometric feature of the first component, the developed numerical control manufacturing program including the manufacturing process parameters;

identify one or both of the manufacturing process data or the manufacturing process parameters for the common geometric feature using a unique ID assigned to the common geometric feature; and execute the developed numerical control manufacturing program to manufacture, at least in part, the common geometric feature of the first component using the numerically-controlled manufacturing device.

10. The system of claim 9, wherein the non-transitory memory further stores a plurality of 3D component models, the plurality of 3D component models including a first 3D component model of the first component and one or more second 3D component models of the respective one or more second components.

11. A computer-implemented method for developing a numerical control manufacturing program for a common geometric feature of a first component, the method comprising:

defining a plurality of geometric features of the first component using a first 3D component model of the first component and a plurality of geometric features of a second component using a second 3D component model, a first of the plurality of geometric features of the first component including the common geometric feature, a first of the plurality of geometric features of the second component including the common geometric feature, a second of the plurality of geometric features of the first component different than a second of the plurality of geometric features of the second component, the first 3D component model and the second 3D component model including the common geometric feature, the common geometric feature indexed in a database using a unique ID;

generating a 3D-model representation of the common geometric feature and assigning the unique ID to the 3D-model representation;

identifying manufacturing process data for the common geometric feature, the manufacturing process data indexed in the database using the unique ID, the manufacturing data associated with one or more numerical control manufacturing processes for the common geometric feature of the second component, and the second component different than the first component;

selecting a numerical control manufacturing process of the one or more numerical control manufacturing processes using the manufacturing process data, wherein the manufacturing process data includes one or more of: process capability (Cpk) data, process performance (Ppk) data, manufacturing cost, manufacturing cycle time, preferred manufacturing site, and/or preferred manufacturer;

obtaining manufacturing process parameters for the selected numerical control manufacturing process; and developing the numerical control manufacturing program for the common geometric feature of the first component, the developed numerical control manufacturing program including at least some of the manufacturing process parameters.

12. The method of claim 11, wherein the second component comprises one or more second components, each of the one or more second components is represented by a respective second 3D component model, each respective second 3D component model stored in the database, each respective second 3D component model including the common geometric feature indexed in the database using the unique ID.

13. The method of claim 11, further comprising identifying the common geometric feature of the first component by determining the common geometric feature of the first component is the same as the common geometric feature of the one or more second components based on one or more predetermined similarity rules.

14. The method of claim 11, wherein the common geometric feature is a surface.

15. The method of claim 11, wherein the selected numerical control manufacturing process includes one or more of a wire electrical discharge machining (WEDM) process, an abrasive machining process, a broaching process, or a milling process.

16. The method of claim 11, wherein the manufacturing process parameters include one or both of computer-aided manufacturing instructions or numerical control manufacturing instructions for the common geometric feature.

* * * * *